(12) United States Patent
Ma et al.

(10) Patent No.: US 11,470,493 B2
(45) Date of Patent: Oct. 11, 2022

(54) METHOD FOR SENDING MEASUREMENT REPORT, COMMUNICATIONS APPARATUS, AND SYSTEM

(71) Applicant: HUAWEI TECHNOLOGIES CO., LTD., Guangdong (CN)

(72) Inventors: Xiaojun Ma, Shenzhen (CN); Chi Zhang, Shanghai (CN); Yafei Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 26 days.

(21) Appl. No.: 16/987,946

(22) Filed: Aug. 7, 2020

(65) Prior Publication Data
US 2020/0367120 A1    Nov. 19, 2020

Related U.S. Application Data

(63) Continuation of application No. PCT/CN2019/074543, filed on Feb. 2, 2019.

(30) Foreign Application Priority Data

Feb. 9, 2018 (CN) .......................... 201810134913.0

(51) Int. Cl.
*H04B 17/24* (2015.01)
*H04B 17/345* (2015.01)
(Continued)

(52) U.S. Cl.
CPC .......... *H04W 24/10* (2013.01); *H04B 17/24* (2015.01); *H04B 17/345* (2015.01);
(Continued)

(58) Field of Classification Search
CPC ......... H04B 7/02–0495; H04B 17/0082–3913; H04J 11/0023–0093;
(Continued)

(56) References Cited

U.S. PATENT DOCUMENTS 9,699,675 B2    7/2017   Wei
9,936,405 B2    4/2018   Seo et al.
(Continued)

FOREIGN PATENT DOCUMENTS

CN    1816198 A     8/2006
CN    101729106 A   6/2010
(Continued)

OTHER PUBLICATIONS

3GPP TSG RAN WG1 NR Ad-Hoc#2, R1-1710129:"Channel sensing based schemes for cross-link interference mitigation in NR", ZTE, Qingdao, P.R.China Jun. 27-30, 2017, total 8 pages.
(Continued)

*Primary Examiner* — Timothy J Weidner (57) ABSTRACT

This application provides a method for sending a measurement report. The method includes a terminal device receiving first configuration information and second configuration information, where the first configuration information indicates a measurement resource and the second configuration information indicates a slot format of a non-serving cell of the terminal. The method also includes the terminal device sending a measurement report to a network device, where a measurement quantity type of the measurement report is related to the slot format of the non-serving cell, and the measurement report corresponds to the measurement resource.

20 Claims, 4 Drawing Sheets

---

301:
A terminal device receives first configuration information and second configuration information, where the first configuration information is used to indicate a measurement resource for interference measurement, and the second configuration information is used to indicate a slot format corresponding to a non-serving cell in which the terminal device is located 302:
The terminal device sends a measurement report to a network device, where a measurement quantity type of the measurement report is related to the slot format corresponding to the non-serving cell (51) Int. Cl.

| | |
|---|---|
| *H04B 17/373* | (2015.01) |
| *H04J 11/00* | (2006.01) |
| *H04L 5/00* | (2006.01) |
| *H04W 24/02* | (2009.01) |
| *H04W 24/08* | (2009.01) |
| *H04W 24/10* | (2009.01) |
| *H04W 36/00* | (2009.01) |
| *H04W 36/08* | (2009.01) |
| *H04W 36/30* | (2009.01) |
| *H04W 72/04* | (2009.01) |
| *H04W 72/08* | (2009.01) |
| *H04W 72/12* | (2009.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC ........ *H04B 17/373* (2015.01); *H04J 11/0053* (2013.01); *H04J 11/0056* (2013.01); *H04J 11/0059* (2013.01); *H04L 5/0073* (2013.01); *H04L 5/0092* (2013.01); *H04L 5/0096* (2013.01); *H04W 24/02* (2013.01); *H04W 24/08* (2013.01); *H04W 36/0058* (2018.08); *H04W 36/0088* (2013.01); *H04W 36/08* (2013.01); *H04W 36/30* (2013.01); *H04W 72/0446* (2013.01); *H04W 72/082* (2013.01); *H04W 72/1231* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ...... H04J 2011/0003–0096; H04L 5/0001–26; H04W 8/22–245; H04W 24/02–10; H04W 36/0005–385; H04W 72/005–14; H04W 84/005–16; H04W 88/005–12; H04W 92/02; H04W 92/04; H04W 92/10; H04W 92/16; H04W 92/18; H04W 92/20
See application file for complete search history.

(56) References Cited

U.S. PATENT DOCUMENTS

| | | | |
|---|---|---|---|
| 2011/0292846 A1 | 12/2011 | Hu et al. | |
| 2012/0236736 A1 | 9/2012 | Frank et al. | |
| 2014/0160967 A1* | 6/2014 | Gao | ..................... H04W 24/10 |
| 2014/0219121 A1 | 8/2014 | Wei | |
| 2016/0050575 A1 | 2/2016 | Seo et al. | |
| 2020/0221464 A1* | 7/2020 | Nielsen | ................. H04W 24/10 |
| 2020/0280357 A1* | 9/2020 | Bae | ..................... H04W 24/10 |

FOREIGN PATENT DOCUMENTS

| | | |
|---|---|---|
| CN | 102308625 A | 1/2012 |
| CN | 103312394 A | 9/2013 |
| CN | 103650572 A | 3/2014 |
| CN | 103974283 A | 8/2014 |
| CN | 105210315 A | 12/2015 |
| EP | 2763456 A1 | 8/2014 |
| EP | 2793414 A1 | 10/2014 |
| WO | 2017059572 A1 | 4/2017 |

OTHER PUBLICATIONS

TCL Communication: Dynamic TDD—SFIHandling and Interference Management 3GPP Draft;R1-1719706, Nov. 17, 2017 (Nov. 17, 20176) XP051368862, total 5 pages.
Office Action in related Chinese Application No. 201810134913.0 dated Mar. 2, 2021, total 5 pages.
Search Report in Chinese Application No. 2018101349130 dated Feb. 9, 2018, total 3 pages.
European Search Report in related EP Application No. 19 75 1846 dated Feb. 26, 2021, total 10 pages.
Kong Yao:"Investigation and handling of a co-channel interference", 2004, total 2 pages.
Chinese Notice of Allowance dated Oct. 20, 2021 for Application No. 201810134913.0, 4 pages.

* cited by examiner

301:
A terminal device receives first configuration information and second configuration information, where the first configuration information is used to indicate a measurement resource for interference measurement, and the second configuration information is used to indicate a slot format corresponding to a non-serving cell in which the terminal device is located 302:
The terminal device sends a measurement report to a network device, where a measurement quantity type of the measurement report is related to the slot format corresponding to the non-serving cell

METHOD FOR SENDING MEASUREMENT REPORT, COMMUNICATIONS APPARATUS, AND SYSTEM

CROSS-REFERENCE TO RELATED APPLICATIONS

This application is a continuation of International Application No. PCT/CN2019/074543, filed on Feb. 2, 2019, which claims priority to Chinese Patent Application No. 201810134913.0, filed on Feb. 9, 2018. The disclosures of the aforementioned applications are hereby incorporated by reference in their entireties.

TECHNICAL FIELD

This application relates to the communications field, and more specifically, to a method for sending a measurement report, a communications apparatus, and a system in the communications field.

BACKGROUND

A 5th generation (5G) mobile communications New Radio (NR) technology supports a dynamic transmission status configuration. A base station of a serving cell sends signaling to a terminal device in the serving cell, to indicate a transmission status in a slot or a symbol within duration of a configuration periodicity. After receiving the message, the terminal device may perform uplink transmission in an uplink slot or symbol based on a scheduling instruction, or perform downlink reception in a downlink slot or symbol. In addition to uplink and/or downlink transmission resources, there is an unknown symbol resource in the symbol in the configuration periodicity. The terminal device does not perform receiving and sending processing on the unknown resource.

Due to the flexible transmission status configuration, when the terminal device obtains an interference measurement result through interference measurement, and reports the interference measurement result to the base station of the serving cell by using a measurement report, the base station of the serving cell cannot determine whether interference corresponding to the interference measurement result is generated by a base station of a non-serving cell or is generated by a terminal device of a non-serving cell. Consequently, subsequent decision behaviors of the base station of the serving cell are affected, and system performance deteriorates.

SUMMARY

With reference to a plurality of implementations, this application provides for sending and/or receiving a measurement report, a communications apparatus, and a system, to improve system performance.

It should be understood that, in this application, the term "and/or" describes an association relationship for describing associated objects and represents that three relationships may exist. For example, "A and/or B" may represent the following three cases: Only A exists, both A and B exist, and only B exists. The character "I" usually indicates an "or" relationship between the associated objects.

According to a first aspect, this application provides a method for sending a measurement report, and the method may be performed by a terminal device. The method includes: receiving, by the terminal device, first configuration information and second configuration information, where the first configuration information is used to indicate a measurement resource, and the second configuration information is used to indicate a slot format of a non-serving cell of the terminal device; and sending, by the terminal device, a measurement report to a network device, where a measurement quantity type of the measurement report is related to the slot format of the non-serving cell, and the measurement report corresponds to the measurement resource.

According to a second aspect, this application provides a method for receiving a measurement report, and the method may be performed by a network device. The method includes: sending, by the network device, first configuration information to a terminal device, where the first configuration information is used to indicate a measurement resource; and receiving, by the network device, a measurement report sent by the terminal device, where a measurement quantity type of the measurement report is related to a slot format of a non-serving cell in which the terminal device is located, and the measurement report corresponds to the measurement resource.

According to a third aspect, this application provides a communications apparatus. The communications apparatus may be a terminal device, or a chip or system-on-a-chip disposed in the terminal device. The communications apparatus includes a processor, where the processor is coupled to a memory, invokes a program stored in the memory, and performs, by using a transceiver, the following steps: receiving first configuration information and second configuration information, where the first configuration information is used to indicate a measurement resource, and the second configuration information is used to indicate a slot format of a non-serving cell of the terminal device; and sending a measurement report to a network device, where a measurement quantity type of the measurement report is related to the slot format of the non-serving cell, and the measurement report corresponds to the measurement resource.

According to a fourth aspect, this application provides a communications apparatus. The communications apparatus may be a network device, or a chip or system-on-a-chip disposed in the network device. The communications apparatus includes a processor, where the processor is coupled to a memory, invokes a program stored in the memory, and performs, by using a transceiver, the following steps: sending first configuration information to a terminal device, where the first configuration information is used to indicate a measurement resource; and receiving a measurement report sent by the terminal device, where a measurement quantity type of the measurement report is related to a slot format of a non-serving cell in which the terminal device is located, and the measurement report corresponds to the measurement resource.

According to the methods or the communications apparatuses provided in the foregoing aspects, based on the slot format of the non-serving cell, the terminal device obtains interference assumption information on the measurement resource, further obtains the measurement quantity type of the measurement report corresponding to the measurement resource, and feeds back the measurement quantity type to the network device by reporting the measurement report. Therefore, the network device can effectively distinguish between interference assumptions, to more effectively perform decision behaviors such as interference coordination management and data transmission scheduling, thereby improving performance of an entire communications system.

With reference to any one of the foregoing aspects, in a possible implementation, that a measurement quantity type of the measurement report is related to the slot format of the non-serving cell includes: the measurement quantity type of the measurement report is related to a slot format that is in slot formats of the non-serving cell and that corresponds to a position of the measurement resource in time domain.

With reference to any one of the foregoing aspects, in a possible implementation, the sending a measurement report to a network device of a serving cell includes: sending, to the network device, the measurement report that carries an identifier, where the identifier is used to indicate the measurement quantity type of the measurement report. Correspondingly, the receiving a measurement report sent by the terminal device includes: receiving the measurement report that carries an identifier and that is sent by the terminal device, where the identifier is used to indicate the measurement quantity type of the measurement report.

With reference to any one of the foregoing aspects, in a possible implementation, the sending a measurement report to a network device of a serving cell includes: sending the measurement report to the network device, where the measurement quantity type of the measurement report is indicated by using a time-frequency resource on which the measurement report is located. Correspondingly, the receiving a measurement report sent by the terminal device includes: receiving the measurement report that is sent by the terminal device and that indicates the measurement quantity type by using a time-frequency resource on which the measurement report is located. The measurement quantity type is indicated by using the time-frequency resource used to send the measurement report, so that the network device (communications apparatus) can effectively distinguish between the interference assumptions, to effectively perform the decision behaviors such as the interference coordination management and the data transmission scheduling, thereby improving the performance of the entire communications system, and reducing signaling overheads.

With reference to any one of the foregoing aspects, in a possible implementation, the sending a measurement report to a network device of a serving cell includes: sending the measurement report to the network device, where the measurement quantity type of the measurement report is indicated by using a value range of a measurement quantity of the measurement report. Correspondingly, the receiving a measurement report sent by the terminal device includes: receiving the measurement report that is sent by the terminal device and that indicates the measurement quantity type by using a range of a measurement quantity of the measurement report. The measurement quantity type is indicated by using the value range that is of the measurement quantity and that is used to send the measurement report, so that the network device (communications apparatus) can effectively distinguish between the interference assumptions, to effectively perform the decision behaviors such as the interference coordination management and the data transmission scheduling, thereby improving the performance of the entire communications system, and reducing signaling overheads.

With reference to any one of the foregoing aspects, in a possible implementation, the sending a measurement report to a network device of a serving cell includes: sending the measurement report to the network device, where the measurement quantity type of the measurement report is indicated by using a position of the measurement report in a reporting periodicity. Correspondingly, the receiving a measurement report sent by the terminal device includes: receiving the measurement report that is sent by the terminal device and that indicates the measurement quantity type by using a position of the measurement report in a reporting periodicity. The measurement quantity type is indicated by using the periodicity in which the measurement report is located, so that the network device (communications apparatus) can effectively distinguish between the interference assumptions, to effectively perform the decision behaviors such as the interference coordination management and the data transmission scheduling, thereby improving the performance of the entire communications system, and reducing signaling overheads.

In a possible implementation, the communications apparatus according to the fourth aspect or the network device according to the second aspect sends trigger signaling to the communications apparatus according to the third aspect or the terminal device according to the first aspect, where the trigger signaling is used to trigger the measurement report to be sent. The communications apparatus according to the third aspect or the terminal device according to the first aspect sends the measurement report to the network device based on the trigger signaling. Optionally, the trigger signaling includes measurement quantity type information of the measurement report, where the trigger signaling requests that the measurement report be triggered to be sent, and if the measurement quantity type information included in the trigger signaling corresponds to the obtained measurement quantity type of the measurement report, the communications apparatus according to the third aspect or the terminal device according to the first aspect sends the measurement report to the network device. The implementation is applicable to a scenario in which a measurement report is reported in an aperiodic reporting manner.

With reference to the second aspect, in a possible implementation, the network device sends second configuration information, where the second configuration information is used to indicate the slot format of the non-serving cell. Correspondingly, the communications apparatus according to the fourth aspect can further implement the following step: sending second configuration information, where the second configuration information is used to indicate the slot format of the non-serving cell.

According to a fifth aspect, this application provides a wireless communications system, including any wireless communications apparatus in the third aspect and various optional implementations of the third aspect, and any wireless communications apparatus in the fourth aspect and various optional implementations of the fourth aspect.

According to a sixth aspect, this application provides a computer-readable storage medium, where the computer-readable storage medium stores program code; and when the program code is executed by a processor, any method in the first aspect, the second aspect, and various optional implementations of the first and the second aspects is implemented.

According to a seventh aspect, a computer program product is provided; and when program code included in the computer program product is executed by a processor, any method in the first aspect, the second aspect, and various optional implementations of the first and the second aspects is implemented.

DESCRIPTION OF EMBODIMENTS

The following describes technical solutions of this application with reference to accompanying drawings.

Embodiments of this application may be applied to, but are not limited to a 5G mobile communications NR system, and may further be applied to a long term evolution (LTE) system, for example, a long term evolution-advanced (LTE-A) system, an enhanced long term evolution-advanced technology (eLTE) system, or another communications system. The embodiments of this application may also be applied to related cellular systems such as a wireless fidelity (WiFi) system, a worldwide interoperability for microwave access (wimax) system, and a 3rd generation partnership project (3GPP) system.

A terminal device in the embodiments of this application may be user equipment (UE), an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal device may further be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be a base station (for example, a macro base station and a micro base station (also referred to as a small cell)), a relay station, an access point, or the like in one of various forms, or may be a device that communicates, in an access network, with a wireless terminal over an air interface by using one or more sectors. When the network device is a base station, the base station may be configured to mutually convert a received over-the-air frame and an Internet Protocol (IP) packet and serve as a router between the wireless terminal and a remaining part of the access network. The remaining part of the access network may include an IP network. The base station may further be configured to coordinate attribute management of the air interface. In communications systems that use different radio access technologies, devices having base station functions may have different names. For example, a base station in a global system for mobile communications (GSM) or a code division multiple access (CDMA) system is referred to as a base transceiver station (BTS), a base station in a wideband code division multiple address (WCDMA) system is referred to as a NodeB (node B), a base station in an LTE system is referred to as an evolved NodeB (evolutional node B, eNB), and a base station in an NR system is referred to as a general NodeB (general node B, gNB). This is not limited in the embodiments of this application.

The following describes some nouns in the embodiments of this application.

A slot is a unit of a resource in time domain for transmitting data. One slot usually includes a plurality of symbols and/or code chips, and the symbols and/or the code chips may have same or different transmission directions.

A slot format is used to indicate a transmission status of a terminal device on a time domain resource. If one slot includes 14 symbols, content carried in each symbol is specified by each slot format. For example, a first symbol is used to carry uplink data, and a second symbol is used to carry downlink data. The transmission status herein may include an uplink state and a downlink state. To be specific, the uplink state is a state in which the terminal device sends information to a network device, and the downlink state is a state in which the terminal device receives information sent by the network device. The transmission status may further include an unknown state or a flexible state. In the two states, the terminal device may not perform receiving and sending processing, the two states are used for the terminal device's internal processing.

The slot format may be obtained by the terminal device by using slot format information (SFI). The SFI may be sent through a group common physical downlink control channel (GC-PDCCH), and carried in downlink control information (DCI), and the format may be a format 2_0. Information about the SFI may also be sent to the terminal device by using Radio Resource Control (RRC) signaling.

A measurement quantity, namely, a value for measuring a measurement result, may correspond to a received signal strength indicator (RSSI), reference signal received quality (RSRQ), CSI-RSRP, channel quality information (CQI), a signal-to-noise ratio (SNR), or the like. A measurement quantity type in this application is described below based on the following content.

Measurement may include measurement that is based on channel state information-interference measurement (CSI-IM), measurement that is based on a non-zero power channel state information-reference signal (CSI-RS), measurement that is based on a demodulation reference signal (DM-RS), measurement that is based on a sounding reference signal (SRS) or measurement that is based on a synchronization signal (SS), measurement that is based on a transmitted data signal, or the like. The technical solutions in the embodiments of this application may be applied to interference measurement or other measurement. For interference measurement, the terminal device measures a signal on a measurement resource, to evaluate a magnitude of interference (for example, downlink interference from a base station in an adjacent cell, uplink interference from a user in an adjacent cell, and reference strength of a channel of another system in a current frequency band) to the terminal device during data transmission. The other measurement may include channel quality measurement, reference signal received power measurement, signal-to-noise ratio measurement, received signal strength indicator measurement, and the like. The interference measurement is used as an example in the following discussion, and the other measurement may be processed based on similar solutions.

Configurations related to the interference measurement may be classified in the following three aspects. The configurations related to the interference measurement may be classified into a resource set (which may also be referred to as a resource setting) used for the interference measurement. The resource set may be corresponding to one or more resource configurations (resource configuration). The configurations related to the interference measurement may be classified into a report set (which may also be referred to as a reporting setting) used for the interference measurement. The report set corresponds to one or more report configurations (report configuration). A report in the report set may explicitly or implicitly include an indication of the measurement quantity, for example, an identifier of the measurement quantity or a value range of the measurement quantity. The configurations related to the interference measurement may be classified into a link list. The link list is used to indicate an association relationship between one of the resource configurations and one of the report configurations. The network device indicates the terminal device to measure a specified resource, and a measurement result is reported to the network device by using a report associated with the specified resource.

A resource in the resource set used for the interference measurement may also be referred to as a measurement resource for the interference measurement, and the measurement resource for the interference measurement is referred to as a measurement resource for short. The measurement resource is used in the following descriptions. The network device may configure a periodic measurement resource for the terminal device. In other words, such a configuration is repeatedly effective for the terminal device in periodicities. The network device may alternatively configure a semi-permanent measurement resource for the terminal device. For example, after the network device indicates, by using media access control (MAC) layer signaling, the configured measurement resource to be activated, such a configuration starts to be repeatedly effective in periodicities. After the network device indicates, by using the MAC layer signaling, the configured measurement resource to be deactivated, the configuration is no longer effective. The network device may alternatively configure an aperiodic measurement resource for the terminal device, and such a configuration is indicated, by using the DCI, to be one-time effective at a specified moment.

A report in the report set used for the interference measurement may also be referred to as a measurement report. The measurement report is used in the following descriptions. The terminal device performs interference measurement on the configured measurement resource, obtains an interference measurement result corresponding to the measurement resource, and reports, by using a measurement report, the interference measurement result to the network device. The measurement report may be reported in any of three manners: periodic reporting, semi-permanent reporting (to be specific, the periodic reporting needs to be started after the network device indicates, by using the MAC layer signaling, the configured measurement resource to be activated; and the reporting needs to be stopped after the network device indicates, by using the MAC layer signaling, the configured measurement resource to be deactivated), or aperiodic reporting (the reporting needs to be one-time started after the network device is indicated by using the DCI). A reporting manner of the measurement report may be configured by the network device.

In an implementation, in the embodiments of this application, the network device may configure a periodic measurement resource for the terminal device, and the terminal device may report a measurement report in a periodic reporting manner. The measurement resource may alternatively be semi-permanent or aperiodic, and the reporting manner of the measurement report may alternatively be a semi-permanent or aperiodic reporting manner.

Figure 1:
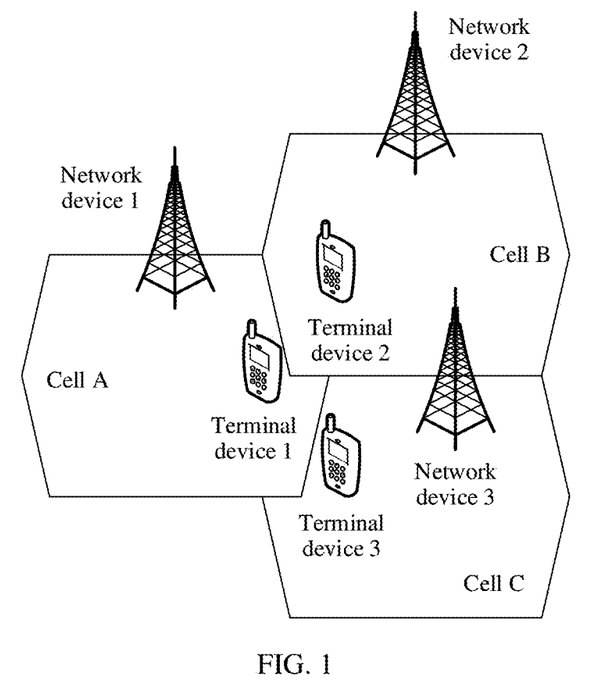
FIG. 1 is a schematic diagram of a communications system.

FIG. 1 is a schematic diagram of a communications system to which the technical solutions of this application are applied. As shown in FIG. 1, a communications system 100 may include a terminal device 1 located in a cell A, a terminal device 2 located in a cell B, and a terminal device 3 located in a cell C. A network device 1, a network device 2, and a network device 3 respectively provide communications services for the terminal device 1, the terminal device 2, and the terminal device 3. For the terminal device 1, the cell A is a serving cell, and the cell B and the cell C are non-serving cells. Optionally, the cell B and the cell C are adjacent cells of the cell A. It should be noted that quantities of terminal devices and network devices included in the communications system 100 are integers greater than or equal to 2. The foregoing is merely an example.

Due to a dynamic transmission status configuration, in a time period, transmission status configurations for different cells may be the same or different. For example, for a slot or a symbol, the terminal device 1 located in the cell A is in a downlink receiving transmission state, and the terminal device 2 located in the cell B is also in a downlink receiving transmission state. Alternatively, for a slot or a symbol, the terminal device 1 located in the cell A is in a downlink receiving transmission state, and the terminal device 2 located in the cell B is in an uplink sending transmission state.

Figure 2A:
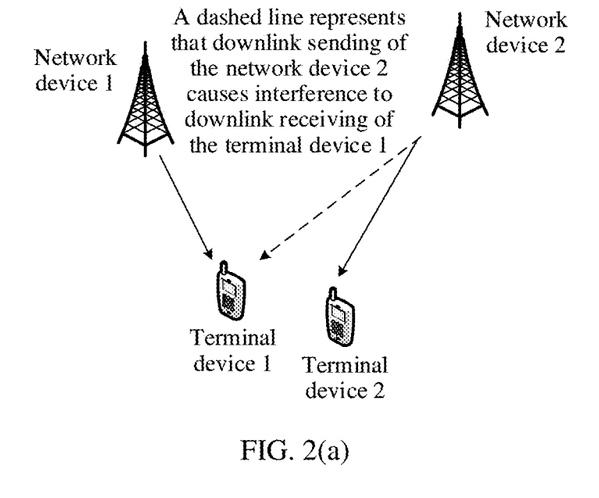
FIG. 2(a) is a schematic diagram of a scenario of an interference assumption.
Figure 2B:
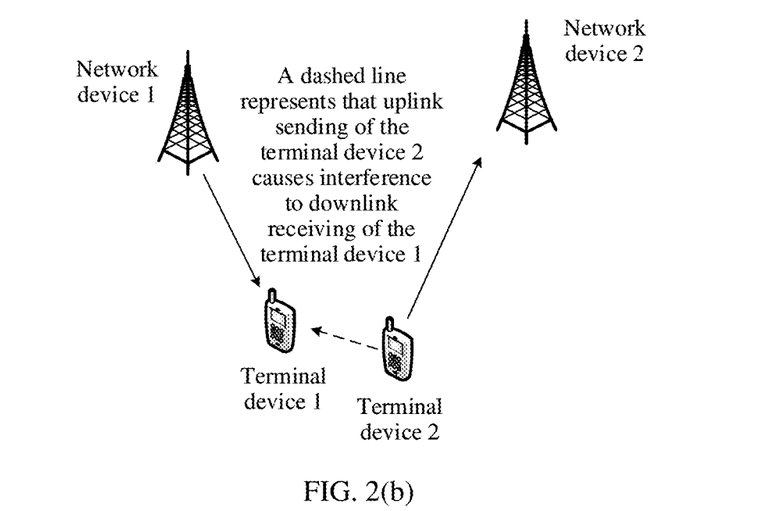
FIG. 2(b) is a schematic diagram of a scenario of another interference assumption.

The foregoing two cases may be respectively corresponding to two different interference assumptions (namely, interference scenarios or measurement scenarios). In the first interference assumption, for a slot or a symbol, the terminal device 1 located in the cell A is in a downlink receiving transmission state, and the terminal device 2 located in the cell B is also in a downlink receiving transmission state. As shown in FIG. 2(a), downlink sending of the network device 2 may cause interference to downlink receiving of the terminal device 1. Such interference may be referred to as codirectional interference, or may be referred to as non-cross link interference or an interference assumption 1 for short. In the second interference assumption, for a slot or a symbol, the terminal device 1 located in the cell A is in a downlink receiving transmission state, and the terminal device 2 located in the cell B is in an uplink sending transmission state. As shown in FIG. 2(b), uplink sending of the terminal device 2 may cause interference to downlink receiving of the network device 1. Such interference may be referred to as contradirectional interference, or may be referred to as cross link interference or an interference assumption 2 for short.

However, in conventional systems, when configuring an interference measurement resource for the terminal device 1, the network device 1 considers merely a transmission status configuration of the cell A that serves as the serving cell, and does not consider a transmission status configuration of the cell B (and/or the cell C) that serves as a non-serving cell. In this way, for a measurement resource, a measurement result obtained by measuring the measurement resource by the terminal device 1 may be corresponding merely to one interference assumption (for example, codirectional interference). Accordingly in the conventional systems, a base station cannot determine whether interference corresponding to the interference measurement result is generated by the network device 2 or the terminal device 2. In such systems, interference generated by the network device is considered to be relatively stable and predictable in a time period. However, due to factors such as a communication characteristic of the terminal device and randomness of a position of the terminal device, interference generated by the terminal device may be relatively unstable and unpredictable in a time period. Consequently, in conventional systems, subsequent decision behaviors (for example, interference coordination and data transmission) of the network device are affected, and consequently performance the communications system deteriorates.

Therefore, in the technical solutions provided in the embodiments of this application, based on a slot format of a non-serving cell, the terminal device obtains interference assumption information on the measurement resource, and further obtains a measurement quantity type of the measurement report corresponding to the measurement resource. Measurement reports of different measurement quantity types may be reported to the network device in different manners, so that the network device can effectively distinguish between the interference assumptions, to more effectively perform decision behaviors such as interference coordination management and data transmission scheduling, thereby improving performance of the entire communications system.

Embodiment 1

Figure 3:
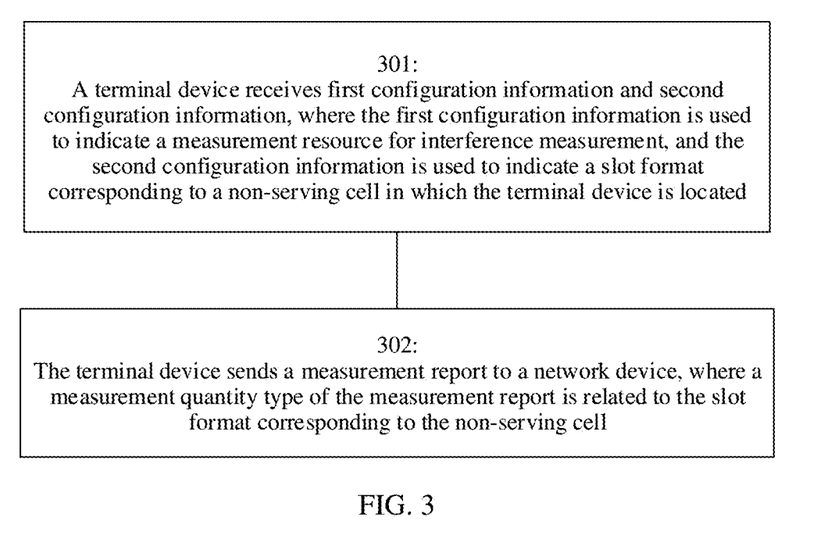
FIG. 3 is a flowchart of a method for sending a measurement report.

FIG. 3 shows a method for sending a measurement report according to an embodiment of this application. The method may be applied to the communications system 100 shown in FIG. 1. The method includes the following steps.

301: A terminal device receives first configuration information and second configuration information, where the first configuration information is used to indicate a measurement resource for interference measurement, and the second configuration information is used to indicate a slot format of a non-serving cell of the terminal device.

The first configuration information may be measurement resource configuration information, including a resource configuration, for example, a position of the measurement resource. In an implementation, the first configuration information may further include a report configuration of a measurement report corresponding to the measurement resource, and/or a link list indicating an association relationship between the resource configuration and the report configuration. The first configuration information may be included in RRC signaling, and the RRC signaling is received by the terminal device from a network device of a serving cell.

The terminal device performs the interference measurement on the measurement resource based on the first configuration information, to obtain a measurement result.

The second configuration information may be SFI. As described above, the SFI may be used to indicate a slot format. Specifically, the second configuration information may be used to indicate a transmission status of each symbol in one or more slots. In other words, the second configuration information may indicate a slot format of one slot, or may indicate slot formats of a plurality of slots. For example, the network device may configure a slot format set, and indicate, by using the second configuration information, one slot format used by the terminal device in a plurality of slots in a current periodicity. It should be noted that the second configuration information may be SFI of a non-serving cell (for example, the cell B and/or the cell C in FIG. 1). In other words, the second configuration information indicates a slot format of the non-serving cell. The terminal device (for example, the terminal device 1 in FIG. 1) may receive the second configuration information from the network device (for example, the network device 1 in FIG. 1) of the serving cell (for example, the cell A in FIG. 1), or may receive the second configuration information from a network device (for example, the network device 2 and/or the network device 3) of non-serving cell. In addition, the second configuration information may be configured by using the RRC signaling, and is semi-static configuration information, to be specific, the configuration information remains unchanged in a time period in which such a configuration is effective. Alternatively, the second configuration information may be configured by using DCI signaling, and is dynamic configuration information, to be specific, content of the configuration information may be updated by using DCI at any time.

Due to the foregoing technical problem in the embodiments of this application, the terminal device further needs to identify an interference assumption corresponding to the measurement result, to determine a measurement quantity type of the measurement report that is reported to the network device.

302: The terminal device sends the measurement report to the network device, where the measurement quantity type of the measurement report is related to the slot format of the non-serving cell.

The corresponding network device (for example, the network device 1 in FIG. 1, namely, the network device of the serving cell) receives the measurement report sent by the terminal device.

Due to a defect in the conventional systems, measurement quantities need to be classified. Such a classification may be based on the foregoing interference assumption. For example, if measurement quantities obtained in a codirectional interference scenario may be classified as measurement quantities of a first type, measurement quantities obtained in a contradirectional interference scenario may be classified as measurement quantities of a second type. In this way, the measurement quantity of the measurement report of the terminal device has a measurement quantity type. The measurement quantity type reflects an interference assumption, and the measurement quantity is obtained based on the interference assumption. Therefore, the network device can effectively distinguish between interference scenarios during actual measurement.

The terminal device may identify, based on the second configuration information received in 301, the interference assumption corresponding to the measurement result, and may further determine the measurement quantity type of the measurement report that is reported to the network device. In this way, the terminal device may report the measurement report to the network device based on the measurement quantity type.

Figure 4A:
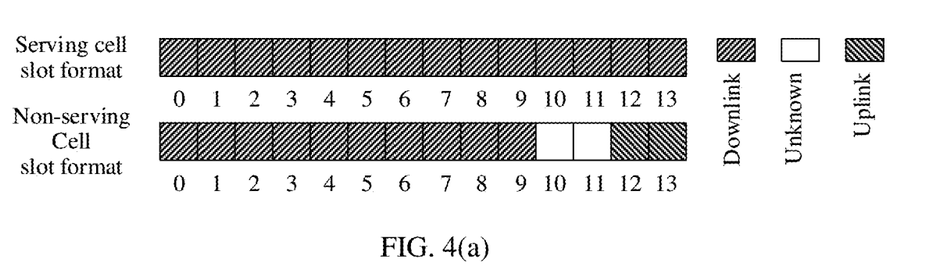
FIG. 4(a) is a schematic diagram of slot formats of a serving cell and a non-serving cell.
Figure 4B:
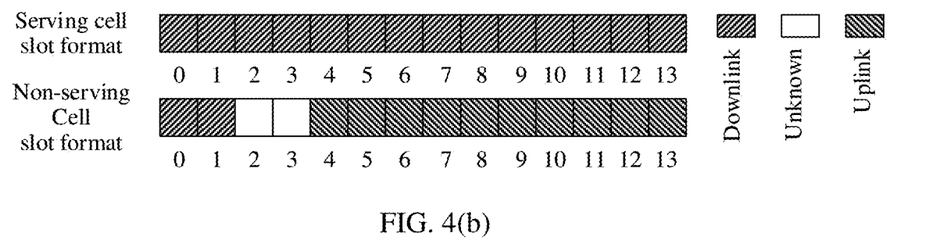
FIG. 4(b) is another schematic diagram of slot formats of a serving cell and a non-serving cell.

That the measurement quantity type of the measurement report is related to the slot format of the non-serving cell specifically means that the measurement quantity type of the measurement report is related to a slot format that is in slot formats of the non-serving cell and that corresponds to a position of the measurement resource in time domain. For details, refer to FIG. 4(a) and FIG. 4(b). The measurement resource may be understood as a time-frequency resource, and a position of the measurement resource in time domain is, for example, a position of a symbol 6. Based on FIG. 4(a), the second configuration information indicates that a transmission direction that is in the symbol 6 and that is of the non-serving cell is downlink, and a transmission direction that is in the symbol 6 and that is of the serving cell in which the terminal device is located is also downlink. This case corresponds to the codirectional interference shown in FIG. 2(a), and the terminal device may determine that the measurement quantity type of the measurement report is a first type, for example, a type 1. Based on FIG. 4(*b*), the second configuration information indicates that a transmission direction that is in the symbol 6 and that is of the non-serving cell is uplink, and a transmission direction that is in the symbol 6 and that is of the serving cell in which the terminal device is located is downlink. This case corresponds to the contradirectional interference shown in FIG. 2(*b*), and the terminal device may determine that the measurement quantity type of the measurement report is a second type, for example, a type 2. Certainly, the position of the measurement resource in time domain may alternatively occupy at least two symbols Manners in which the terminal device identifies the measurement quantity type of the measurement report are similar.

In the technical solutions provided in this embodiment, based on the slot format of the non-serving cell, the terminal device obtains interference assumption information on the measurement resource, further obtains the measurement quantity type of the measurement report corresponding to the measurement resource, and feeds back the measurement quantity type to the network device by reporting the measurement report. Therefore, the network device can effectively distinguish between the interference assumptions, to more effectively perform decision behaviors such as interference coordination management and data transmission scheduling, thereby improving performance of the entire communications system.

Embodiment 2

Embodiment 2 may be based on Embodiment 1, and includes all technical solutions in Embodiment 1. In addition, Embodiment 2 provides a specific implementation of sending the measurement report to the network device by the terminal device in step 302 in Embodiment 1.

In this embodiment, the first configuration information may include a plurality of report configurations, and the plurality of report configurations may be associated with one resource configuration by using a link list. In other words, a plurality of measurement reports may be corresponding to one measurement resource.

In an implementation, the first configuration information may carry a plurality of new identifiers, and the plurality of new identifiers are used to indicate measurement quantity types of measurement reports. For example, the first configuration information carries two new identifiers, and the two new identifiers are respectively used to indicate the first type (corresponding to the codirectional interference) and the second type (corresponding to the contradirectional interference).

In another implementation, the first configuration information may carry a plurality of extension identifiers, and the plurality of identifiers are used to indicate measurement quantity types of measurement reports. An extension identifier may be understood as an existing identifier in the conventional systems. For example, two extension identifiers are carried, and the two extension identifiers are respectively used to indicate the first type (corresponding to the codirectional interference) and the second type (corresponding to the contradirectional interference).

Based on the technical solutions in Embodiment 1, the terminal device may identify the measurement quantity type of the measurement report, and the measurement quantity type may further be stored and/or filtered into a corresponding subset of measurement quantity types. The subset of measurement quantity types may be corresponding to an identifier.

Based on the foregoing technical solutions, the following describes the specific implementation of sending the measurement report to the network device by the terminal device in 302.

The terminal device sends, to the network device, the measurement report that carries an identifier, where the identifier is used to indicate the measurement quantity type of the measurement report. The identifier carried in the measurement report herein is an identifier corresponding to the subset of measurement quantity types. The terminal device may be informed of the identifier in advance by using the second configuration information, so that consistent understandings of the terminal device and the network device are reached. The network device may determine, by using the measurement report, an interference assumption on which measurement is based.

In this embodiment of this application, the terminal device sends, to the network device, the measurement report that carries the identifier. The identifier may indicate a measurement quantity type. Therefore, the network device can effectively distinguish between the interference assumptions, to effectively perform the decision behaviors such as the interference coordination management and the data transmission scheduling, thereby improving the performance of the entire communications system.

Embodiment 3

Embodiment 3 may be based on Embodiment 1, and includes all technical solutions in Embodiment 1. In addition, Embodiment 3 provides a specific implementation of sending the measurement report to the network device by the terminal device in step 302 in Embodiment 1.

The following describes the specific implementation of sending the measurement report to the network device by the terminal device in 302.

The terminal device sends the measurement report to the network device, where the measurement quantity type of the measurement report is indicated by using the time-frequency resource on which the measurement report is located.

Based on the technical solutions in Embodiment 1, the terminal device may identify the measurement quantity type of the measurement report, and the measurement quantity type may further be stored and/or filtered into a corresponding subset of measurement quantity types.

In an implementation, in a manner of indicating the measurement quantity type of the measurement report by using the time-frequency resource on which the measurement report is located, when the measurement report is sent to the network device through an uplink control channel, the measurement quantity type of the measurement report is the first type (corresponding to the codirectional interference). Alternatively, when the measurement report is sent to the network device through an uplink data channel, the measurement quantity type of the measurement report is the second type (corresponding to the contradirectional interference). In this case, the time-frequency resource on which the measurement report is located may be understood as a channel resource carrying the measurement report. Consistent understandings of the network device and the terminal device on a correspondence between the type and the time-frequency resource used to send the measurement report need to be reached, and the consistent understandings may be implemented in a form such as a form of protocol pre-agreement or signaling interaction.

In this embodiment, the terminal device sends the measurement report to the network device, and the measurement quantity type is indicated by using the time-frequency resource used to send the measurement report, so that the network device can effectively distinguish between the interference assumptions, to effectively perform the decision behaviors such as the interference coordination management and the data transmission scheduling, thereby improving the performance of the entire communications system, and reducing signaling overheads.

Embodiment 4

Embodiment 4 may be based on Embodiment 1, and includes all technical solutions in Embodiment 1. In addition, Embodiment 4 provides a specific implementation of sending the measurement report to the network device by the terminal device in step 302 in Embodiment 1.

The following describes the specific implementation of sending the measurement report to the network device by the terminal device in 302.

The terminal device sends the measurement report to the network device, where the measurement quantity type of the measurement report is indicated by using a value range of a measurement quantity.

Based on the technical solutions in Embodiment 1, the terminal device may identify the measurement quantity type of the measurement report, and the measurement quantity type may further be stored and/or filtered into a corresponding subset of measurement quantity types.

In an implementation, in a manner of indicating the measurement quantity type of the measurement report by using the value range of the measurement quantity of the measurement report, when the value range of the measurement quantity is [0, 255], and is used to indicate a result of a measurement quantity of the first type, the measurement quantity type of the measurement report is the first type (corresponding to the codirectional interference). Alternatively, when the value range of the measurement quantity is [256, 511], and is used to indicate a result of a measurement quantity of the second type, the measurement quantity type of the measurement report is the second type (corresponding to the contradirectional interference). After obtaining the value range of the measurement quantity from the measurement report, the network device may obtain an actual value of the measurement quantity in a predefined mapping manner. Certainly, consistent understandings of the network device and the terminal device on a correspondence between the measurement quantity type and the value range that is of the measurement quantity and that is used to send the measurement report need to be reached, and the consistent understandings may be implemented in a form such as a form of protocol pre-agreement or signaling interaction.

In this embodiment of this application, the terminal device sends the measurement report to the network device, and the measurement quantity type is indicated by using the value range that is of the measurement quantity and that is used to send the measurement report, so that the network device can effectively distinguish between the interference assumptions, to effectively perform the decision behaviors such as the interference coordination management and the data transmission scheduling, thereby improving the performance of the entire communications system, and reducing signaling overheads.

Embodiment 5

Embodiment 5 may be based on Embodiment 1, and includes all technical solutions in Embodiment 1. In addition, Embodiment 5 provides a specific implementation of sending the measurement report to the network device by the terminal device in step 302 in Embodiment 1.

In Embodiment 5, the network device may configure a periodic measurement resource or a semi-permanent measurement resource for the terminal device, and the terminal device may report the measurement report in a periodic or semi-permanent reporting manner.

The following describes the specific implementation of sending the measurement report to the network device by the terminal device in 302.

The terminal device sends the measurement report to the network device, where the measurement quantity type of the measurement report is indicated by using a position of the measurement report in a reporting periodicity.

For example, the reporting setting configured by the network device for the terminal device includes periodic measurement report reporting. In an implementation, the position that is in time domain and that is used to report the measurement report may be represented by using an expression (N*T+offset). N is a periodicity sequence number, T is periodicity duration, and offset represents a sequence number of a symbol where the measurement report is located in each periodicity. When T is equal to a length of one slot, N may be understood as a sequence number of the slot. N and offset are integers greater than or equal to 0, and T is a positive number.

Based on the technical solutions in Embodiment 1, the terminal device may identify the measurement quantity type of the measurement report, and the measurement quantity type may further be stored and/or filtered into a corresponding subset of measurement quantity types. A subset of measurement quantity types may be corresponding to a group of periodicity sequence numbers. For example, a periodicity sequence number corresponding to the first type (corresponding to the codirectional interference) is an odd number, and a periodicity sequence number corresponding to the second type (corresponding to the contradirectional interference) is an even number. Alternatively, a periodicity sequence number corresponding to the first type (corresponding to the codirectional interference) is an even number, and a periodicity sequence number corresponding to the second type (corresponding to the contradirectional interference) is an odd number. When there are more types, the periodicity may further be correspondingly extended.

Therefore, the terminal device sends the measurement report to the network device. When a periodicity number corresponding to the periodicity in which the measurement report is located is an odd number, the measurement quantity type of the measurement report is the first type (corresponding to the codirectional interference). When a periodicity number corresponding to the periodicity in which the measurement report is located is an even number, the measurement quantity type of the measurement report is the second type (corresponding to the contradirectional interference). Alternatively, the terminal device sends the measurement report to the network device. When a periodicity number corresponding to the periodicity in which the measurement report is located is an even number, the measurement quantity type of the measurement report is the first type (corresponding to the codirectional interference). When a periodicity number corresponding to the periodicity in which the measurement report is located is an odd number, the measurement quantity type of the measurement report is the second type (corresponding to the contradirectional interference).

In this embodiment of this application, the terminal device sends the measurement report to the network device, and the measurement quantity type is indicated by using the periodicity in which the measurement report is located, so that the network device can effectively distinguish between the interference assumptions, to effectively perform the decision behaviors such as the interference coordination management and the data transmission scheduling, thereby improving the performance of the entire communications system, and reducing signaling overheads.

Embodiment 6

Embodiment 6 may be based on Embodiment 1, and includes all technical solutions in Embodiment 1.

In Embodiment 6, the terminal device may report the measurement report in an aperiodic reporting manner. In other words, the network device needs to indicate, by using the DCI, the terminal device to one-time report the measurement report.

In addition to all steps in Embodiment 1, Embodiment 6 may further include the following step.

The network device (for example, the network device 1 in FIG. 1) sends trigger information to the terminal device (for example, the terminal device 1 in FIG. 1).

Correspondingly, the terminal device receives the trigger information.

This step may be performed before step 302. The trigger information may be report trigger (report trigger), and is included in the DCI. The DCI may further carry measurement quantity type information of the measurement report, where the trigger information requests that the measurement report be triggered to be sent. Optionally, the measurement quantity type information of the measurement report may be represented by using an identifier.

In step 302, the terminal device further sends the measurement report to the network device based on the trigger information.

Based on the technical solutions in Embodiment 1, the terminal device may identify the measurement quantity type of the measurement report, and the measurement quantity type may further be stored and/or filtered into a corresponding subset of measurement quantity types. If the measurement quantity type information included in the trigger signaling corresponds to the measurement quantity type of the measurement report, the terminal device sends the measurement report to the base station.

In this embodiment of this application, for a scenario in which the terminal device aperiodically reports the measurement report, when the network device needs to report a measurement report of a measurement quantity type, the terminal device reports the measurement report of the type, so that the network device can effectively perform the decision behaviors such as the interference coordination management and the data transmission scheduling, thereby improving the performance of the entire communications system.

It should be noted that, in any one of the foregoing embodiments, when the terminal device needs to determine the measurement quantity type of the measurement report on the measurement resource based on slot formats corresponding to a plurality of non-serving cells, if in the position of the measurement resource in time domain, a slot format corresponding to at least one non-serving cell is different from a slot format of a serving cell, and in other words, if a slot format, namely, a transmission direction, of a non-serving cell is uplink, it is considered that the measurement quantity type that is of the measurement report and that is obtained by measuring the measurement resource is the second type (the contradirectional interference). Alternatively, if in the position of the measurement resource in time domain, slot formats, namely, transmission directions, corresponding to a plurality of non-serving cells each are downlink, it may be considered that the measurement quantity type of the measurement report is the first type (the codirectional interference).

It should be further understood that the foregoing description is intended to help a person skilled in the art better understand the embodiments of this application, but is not intended to limit the scope of the embodiments of this application. A person skilled in the art may make various equivalent modifications or changes based on the examples described above, and such modifications or changes also fall within the scope of the embodiments of this application.

It should be further understood that sequence numbers of the foregoing processes do not mean execution sequences. The execution sequences of the processes should be determined based on functions and internal logic of the processes, and should not be construed as any limitation on implementation processes of the embodiments of this application.

Figure 5:
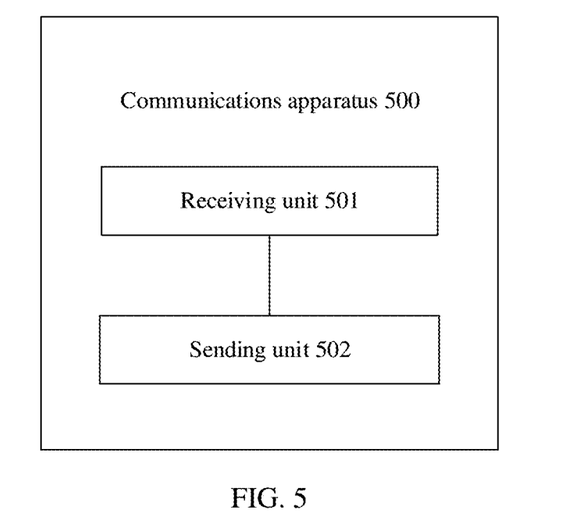
FIG. 5 is a schematic structural diagram of a communications apparatus.
Figure 6:
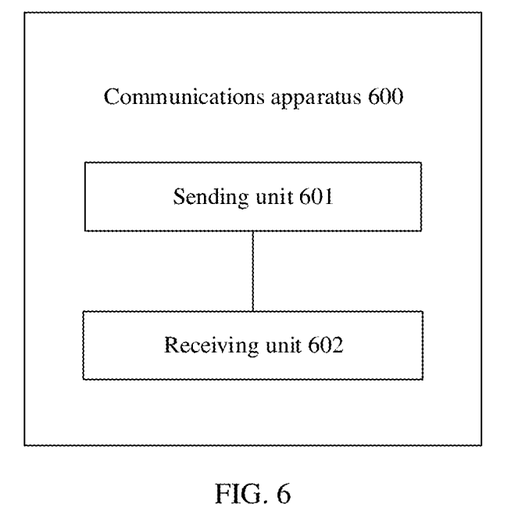
FIG. 6 is a schematic structural diagram of another communications apparatus.
Figure 7:
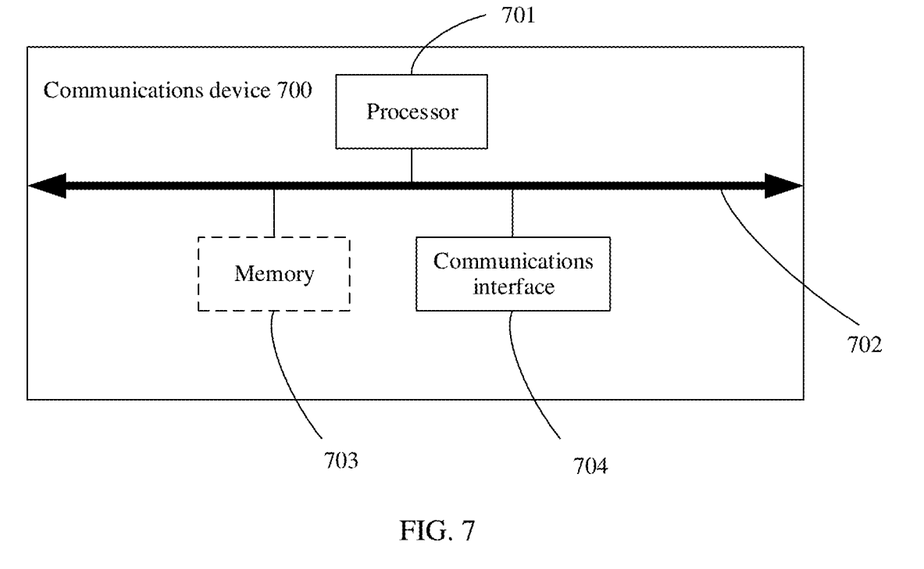
FIG. 7 is a schematic structural diagram of still another communications apparatus.

With reference to FIG. 1 to FIGS. 4(a)-(b), the foregoing describes in detail the method for sending the measurement report according to the embodiments of this application. With reference to FIG. 5 to FIG. 7, the following describes a communications apparatus according to some embodiments of this application. The communications apparatus embodiments mutually correspond to the method embodiments. For similar descriptions, refer to the method embodiments.

Embodiment 7

FIG. 5 is a schematic block diagram of a communications apparatus according to an embodiment of this application. It should be understood that a communications apparatus 500 shown in FIG. 5 may be configured to perform the steps performed by the terminal device in any of Embodiment 1 to Embodiment 6. The communications apparatus 500 includes a receiving unit 501 and a sending unit 502.

The receiving unit 501 is configured to receive first configuration information and second configuration information, where the first configuration information is used to indicate a measurement resource, and the second configuration information is used to indicate a slot format of a non-serving cell of the terminal device.

The sending unit 502 is configured to send a measurement report to a network device, where a measurement quantity type of the measurement report is related to the slot format of the non-serving cell, and the measurement report corresponds to the measurement resource.

Optionally, that the measurement quantity type of the measurement report is related to the slot format of the non-serving cell includes: the measurement quantity type of the measurement report is related to a slot format that is in slot formats of the non-serving cell and that corresponds to a position of the measurement resource in time domain.

The sending unit 502 may be specifically configured to: send, to the network device, the measurement report that carries an identifier, where the identifier is used to indicate the measurement quantity type of the measurement report; send the measurement report to the network device, where the measurement quantity type of the measurement report is indicated by using a time-frequency resource on which the measurement report is located; send the measurement report to the network device, where the measurement quantity type of the measurement report is indicated by using a value range of a measurement quantity of the measurement report; or send the measurement report to the network device, where the measurement quantity type of the measurement report is indicated by using a position of the measurement report in a reporting periodicity.

Optionally, the receiving unit 501 may further be configured to receive trigger signaling sent by the network device. In such a scenario, if measurement quantity type information included in the trigger signaling corresponds to the measurement quantity type of the measurement report, the sending unit 502 sends the measurement report to the network device.

FIG. 6 is a schematic block diagram of a communications apparatus according to another embodiment of this application. It should be understood that a communications apparatus 600 shown in FIG. 6 may be configured to perform the steps performed by the network device in any of Embodiment 1 to Embodiment 6. The communications apparatus 600 includes a sending unit 601 and a receiving unit 602.

The sending unit 601 is configured to send first configuration information to a terminal device, where the first configuration information is used to indicate a measurement resource.

The receiving unit 602 is configured to receive a measurement report sent by the terminal device, where a measurement quantity type of the measurement report is related to a slot format of a non-serving cell of the terminal device, and the measurement report corresponds to the measurement resource.

Optionally, the sending unit 601 is further configured to send second configuration information to the terminal device, where the second configuration information is used to indicate the slot format of the non-serving cell.

Optionally, that the measurement quantity type of the measurement report is related to the slot format of the non-serving cell includes: the measurement quantity type of the measurement report is related to a slot format that is in slot formats of the non-serving cell and that corresponds to a position of the measurement resource in time domain.

The receiving unit 602 may be specifically configured to: receive the measurement report that carries an identifier and that is sent by the terminal device, where the identifier is used to indicate the measurement quantity type of the measurement report; receive the measurement report that is sent by the terminal device and that indicates the measurement quantity type by using a time-frequency resource on which the measurement report is located; receive the measurement report that is sent by the terminal device and that indicates the measurement quantity type by using a range of a measurement quantity of the measurement report; or receive the measurement report that is sent by the terminal device and that indicates the measurement quantity type by using a position of the measurement report in a reporting periodicity.

Optionally, the sending unit 601 is further configured to send trigger signaling to the terminal device, where the trigger signaling is used to trigger the measurement report to be sent. The trigger signaling may include measurement quantity type information of the measurement report, where the trigger signaling requests that the measurement report be triggered to be sent.

It should be noted that it should be understood that division of the units of the communications device 500 and the communications device 600 is merely logic function division. During actual implementation, the units may be all or partially integrated into a physical entity, or may be physically separated. In addition, all of the units may be implemented in a form of software invoked by a processing element or in a form of hardware. Alternatively, some of the units may be implemented in a form of software invoked by a processing element or in a form of hardware. For example, the sending unit may be an independently disposed processing element, or may be integrated into a chip of the network device for implementation. In addition, the sending unit may alternatively be stored in a memory of the network device in a form of a program, and a processing element of the network device invokes and executes a function of the sending unit. Implementation of another unit may be similar. In addition, the units may be completely or partially integrated together or may be individually implemented. The processing element may be an integrated circuit and has a signal processing capability. In an implementation process, steps in the foregoing methods or the foregoing units can be implemented by using an integrated logic circuit formed as hardware or an instruction formed as software in the processing element. In addition, the sending unit 502 or the sending unit 601 is a sending control unit, and may send information by using a sending apparatus of the communications device 500 or a sending apparatus of the communications device 600, for example, an antenna and a radio frequency apparatus. Similarly, the receiving unit 501 or the receiving unit 602 is a receiving control unit, and may receive information by using a receiving apparatus of the communications device 500 or a receiving apparatus of the communications device 600, for example, an antenna and a radio frequency apparatus.

The foregoing units may be configured as one or more integrated circuits for performing the foregoing methods, for example, one or more application-specific integrated circuits (ASIC), one or more microprocessors, or one or more field programmable gate arrays (FPGA). For another example, when one of the foregoing units is implemented by scheduling a program by a processing element, the processing element may be a general purpose processor, for example, a central processing unit (CPU) or another processor that can invoke a program. For another example, the units can be integrated together and implemented in a form of a system-on-a-chip (SOC).

In the technical solutions provided in this embodiment of this application, based on the slot format of the non-serving cell, the terminal device obtains interference assumption information on the measurement resource, and further obtains the measurement quantity type of the measurement report corresponding to the measurement resource. Measurement reports of different measurement quantity types may be reported to the network device in different manners, so that the network device can effectively distinguish between interference assumptions, to more effectively perform decision behaviors such as interference coordination management and data transmission scheduling, thereby improving performance of the entire communications system.

Embodiment 8

FIG. 7 is a schematic structural diagram of hardware of a communications device 700 according to an embodiment of this application. The communications device 700 includes at least one processor 701, a communications bus 702, and at least one communications interface 704, and may further include a memory 703.

The processor 701 may be a general-purpose central processing unit (CPU), a microprocessor, an application-specific integrated circuit (ASIC), or one or more integrated circuits configured to control program execution in the solutions of this application.

The communications bus 702 may include a channel, and transmits information between the foregoing components.

The communications interface 704 that uses any apparatus such as a transceiver is configured to communicate with another device or a communications network, for example, Ethernet, a radio access network (RAN), or a wireless local area network (WLAN).

The memory 703 may be a read-only memory (ROM) or another type of static storage device that can store static information and an instruction, a random access memory (RAM) or another type of dynamic storage device that can store information and an instruction, an electrically erasable programmable read-only memory (EEPROM), a compact disc read-only memory (CD-ROM) or another compact disc storage medium, an optical disc storage medium (including a compact disc, a laser disc, an optical disc, a digital versatile disc, a Blu-ray optical disc, or the like), a magnetic disk storage medium or another magnetic storage device, or any other medium that can carry or store expected program code in a form of an instruction or a data structure and that can be accessed by a computer, but the memory 703 is not limited thereto. The memory may exist independently, and is connected to the processor by using the bus. Alternatively, the memory may be integrated with the processor.

The memory 703 is configured to store application program code for performing the solutions of this application, and execution of the solutions is controlled by the processor 701. The processor 701 is configured to execute the application program code stored in the memory 703, thereby implementing the steps performed by the terminal device or the network device in any of Embodiment 1 to Embodiment 6 of this application.

In an implementation, the processor 701 may include one or more CPUs.

In an implementation, the communications device 700 may include a plurality of processors. Each of the processors may be a single-core (single-CPU) processor or a multi-core (multi-CPU) processor. The processors herein may be one or more devices, circuits, and/or processing cores for processing data (for example, a computer program instruction).

In an implementation, the communications device 700 may further include an output device and an input device. The output device communicates with the processor 701, and may display information in a plurality of manners. For example, the output device may be a liquid crystal display (LCD), a light emitting diode (LED) display device, a cathode ray tube (CRT) display device, a projector, or the like. The input device communicates with the processor 701, and may receive user input in a plurality of manners. For example, the input device may be a mouse, a keyboard, a touchscreen device, or a sensing device.

In addition, as described above, the communications device 700 provided in this embodiment of this application may be a chip, the terminal device, the network device, or a device having a structure similar to that in FIG. 7. A type of the communications device 700 is not limited in this embodiment of this application.

It should be further noted that the memory 703 may alternatively be located outside the communications apparatus 700, for example, an off-chip memory.

In addition, this embodiment of this application provides a chip system. The chip system includes a processor, configured to support the communications device in implementing the method for sending the measurement report in the foregoing embodiments, for example, determining a symbol used to transmit a demodulation reference signal through a shared channel. In a possible implementation, the chip system further includes a memory. The memory is configured to store a program instruction and data required by the communications device. The chip system may include a chip, or may include a chip and another discrete device. This is not specifically limited in this embodiment of this application.

It should be noted that all or some of the foregoing embodiments may be implemented by using software, hardware, firmware, or a combination thereof. When a software program is used to implement the embodiments, the embodiments may be implemented completely or partially in a form of a computer program product. The computer program product includes one or more computer instructions. When the computer program instructions are loaded and executed on a computer, the procedure or functions described in the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device such as a server or a data center integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

The foregoing descriptions are merely specific implementations of this application, but are not intended to limit the protection scope of this application. Variation or replacement readily figured out by any person skilled in the art within the technical scope disclosed in this application shall fall within the protection scope of this application. Therefore, the protection scope of this application shall be subject to the protection scope of the claims.

What is claimed is:

1. A method for sending a measurement report, comprising:
   receiving, by a terminal device, first configuration information and second configuration information, wherein the first configuration information indicates a measurement resource, and the second configuration information indicates a first slot format in slot formats of a non-serving cell of the terminal device and a second slot format in the slot formats of the non-serving cell; and
   sending, by the terminal device, the measurement report to a network device, wherein the measurement report indicates a measurement quantity type that is a first measurement quantity type or a second measurement quantity type, the first measurement quantity type is related to the first slot format of the non-serving cell and the second measurement quantity type is related to the second slot format of the non-serving cell, and the measurement report corresponds to the measurement resource, wherein the first slot format of the non-serving cell is in a first position of the measurement resource in time domain and the second slot format of the non-serving cell is in a second position of the measurement resource in time domain, when the first slot format of the non-serving cell is different from a first slot format of a serving cell of the terminal device in the first position of the measurement resource in time domain and the first slot format of the non-serving cell is uplink, the second measurement quantity type represents a contradirectional interference, and when the second slot format of the non-serving cell is downlink, the measurement quantity type of the measurement report is the first measurement quantity type, wherein the first measurement quantity type represents a codirectional interference.

2. The method according to claim 1, wherein the sending, by the terminal device, a measurement report to a network device comprises:

sending, by the terminal device to the network device, the measurement report that carries an identifier indicating the measurement quantity type of the measurement report.

3. The method according to claim 1, wherein the sending, by the terminal device, a measurement report to a network device comprises:

sending, by the terminal device, the measurement report to the network device, wherein the measurement quantity type of the measurement report is indicated by using a time-frequency resource on which the measurement report is located.

4. The method according to claim 1, further comprising:
receiving, by the terminal device, trigger signaling sent by the network device; and
sending, by the terminal device, the measurement report to the network device based on the trigger signaling.

5. The method according to claim 4, wherein the sending, by the terminal device, the measurement report to the network device based on the trigger signaling comprises:

if measurement quantity type information comprised in the trigger signaling corresponds to the measurement quantity type of the measurement report, sending, by the terminal device, the measurement report to the network device.

6. The method according to claim 1, wherein the sending, by the terminal device, a measurement report to a network device comprises sending a first measurement report to the network device, the first measurement report indicates a first measurement quantity type that corresponds to the measurement resource and that is related to the first slot format of the non-serving cell, and the method further comprises sending, by the terminal device, a second measurement report to the network device, wherein the second measurement report indicates a second measurement quantity type that corresponds to the measurement resource and that is related to the second slot format of the non-serving cell.

7. A method for receiving a measurement report, comprising:

sending, by a network device, first configuration information to a terminal device, wherein the first configuration information indicates a measurement resource; and receiving, by the network device, the measurement report sent by the terminal device, wherein the measurement report indicates a measurement quantity type that is a first measurement quantity type or a second measurement quantity type, the first measurement quantity type is related to a first slot format in slot formats of a non-serving cell of the terminal device and the second measurement quantity type is related to a second slot format in the slot formats of the non-serving cell, and the measurement report corresponds to the measurement resource, wherein the first slot format of the non-serving cell is in a first position of the measurement resource in time domain and the second slot format of the non-serving cell is in a second position of the measurement resource in time domain, when the first slot format of the non-serving cell is different from a first slot format of a serving cell of the terminal device in the first position of the measurement resource in time domain and the first slot format of the non-serving cell is uplink, the second measurement quantity type represents a contradirectional interference, and when the second slot format of the non-serving cell is downlink, the measurement quantity type of the measurement report is the first measurement quantity type, wherein the first measurement quantity type represents a codirectional interference.

8. The method according to claim 7, further comprising:
sending, by the network device, second configuration information to the terminal device, wherein the second configuration information indicates the slot formats of the non-serving cell.

9. The method according to claim 7, further comprising:
sending, by the network device, trigger signaling to the terminal device, wherein the trigger signaling is used to trigger the measurement report to be sent; and wherein the trigger signaling comprises measurement quantity type information of the measurement report.

10. The method according to claim 7, wherein the receiving, by the network device, the measurement report sent by the terminal device comprises receiving a first measurement report, the first measurement report indicates a first measurement quantity type that corresponds to the measurement resource and that is related to the first slot format of the non-serving cell, and the method further comprises receiving, by the network device, a second measurement report, wherein the second measurement report indicates a second measurement quantity type that corresponds to the measurement resource and that is related to the second slot format of the non-serving cell.

11. A communication apparatus, comprising:
a memory storing instructions; and
a processor coupled to the memory to execute the instructions for:
receiving first configuration information and second configuration information, wherein the first configuration information indicates a measurement resource, and the second configuration information indicates a first slot format in slot formats of a non-serving cell of a terminal device and a second slot format in the slot formats of the non-serving cell; and sending a measurement report to a network device, wherein the measurement report indicates a measurement quantity type that is a first measurement quantity type or a second measurement quantity type, the first measurement quantity type is related to the first slot format of the non-serving cell and the second measurement quantity type is related to the second slot format of the non-serving cell, and the measurement report corresponds to the measurement resource, wherein the first slot format of the non-serving cell is in a first position of the measurement resource in time domain and the second slot format of the non-serving cell is in a second position of the measurement resource in time domain, when the first slot format of the non-serving cell is different from a first slot format of a serving cell of the terminal device in the first position of the measurement resource in time domain and the first slot format of the non-serving cell is uplink, the second measurement quantity type represents a contradirectional interference, and when the second slot format of the non-serving cell is downlink, the measurement quantity type of the measurement report is the first measurement quantity type, wherein the first measurement quantity type represents a codirectional interference.

12. The communication apparatus according to claim 11, wherein the sending a measurement report to a network device, comprises: sending to the network device, the measurement report that carries an identifier, wherein the identifier indicates the measurement quantity type of the measurement report.

13. The communication apparatus according to claim 11, wherein the sending a measurement report to a network device, comprises: sending the measurement report to the network device, wherein the measurement quantity type of the measurement report is indicated by using a time-frequency resource on which the measurement report is located.

14. The communication apparatus according to claim 11, the processor coupled to the memory to further execute the instructions for:

receiving trigger signaling sent by the network device; and sending the measurement report to the network device based on the trigger signaling.

15. The communication apparatus according to claim 14, wherein the sending the measurement report to the network device based on the trigger signaling, comprises: if measurement quantity type information comprised in the trigger signaling corresponds to the measurement quantity type of the measurement report, sending the measurement report to the network device.

16. The communication apparatus according to claim 11, wherein the sending a measurement report to a network device comprises sending a first measurement report to the network device, the first measurement report indicates a first measurement quantity type that corresponds to the measurement resource and that is related to the first slot format of the non-serving cell, and the processor further executes instructions for sending, by the terminal device, a second measurement report to the network device, wherein the second measurement report indicates a second measurement quantity type that corresponds to the measurement resource and that is related to the second slot format of the non-serving cell.

17. A communication apparatus, comprising:
a memory storing instructions; and
a processor coupled to the memory to execute the instructions for:

sending first configuration information to a terminal device, wherein the first configuration information indicates a measurement resource; and receiving a measurement report sent by the terminal device, wherein the measurement report indicates a measurement quantity type that is a first measurement quantity type or a second measurement quantity type, the first measurement quantity type is related to a first slot format in slot formats of a non-serving cell of the terminal device and the second measurement quantity type is related to a second slot format in the slot formats of the non-serving cell, and the measurement report corresponds to the measurement resource, wherein the first slot format of the non-serving cell is in a first position of the measurement resource in time domain and the second slot format of the non-serving cell is in a second position of the measurement resource in time domain, when the first slot format of the non-serving cell is different from a first slot format of a serving cell of the terminal device in the first position of the measurement resource in time domain and the first slot format of the non-serving cell is uplink, the second measurement quantity type represents a contradirectional interference, and when the second slot format of the non-serving cell is downlink, the measurement quantity type of the measurement report is the first measurement quantity type, wherein the first measurement quantity type represents a codirectional interference.

18. The communication apparatus according to claim 17, the processor coupled to the memory to further execute the instructions for:

sending second configuration information to the terminal device, wherein the second configuration information indicates the slot formats of the non-serving cell.

19. The communication apparatus according to claim 17, the processor coupled to the memory to further execute the instructions for:

sending trigger signaling to the terminal device, wherein the trigger signaling is used to trigger the measurement report to be sent, and the trigger signaling comprises measurement quantity type information of the measurement report.

20. The communication apparatus according to claim 17, wherein the receiving, by the network device, the measurement report sent by the terminal device comprises receiving a first measurement report, the first measurement report indicates a first measurement quantity type that corresponds to the measurement resource and that is related to the first slot format of the non-serving cell, and the processor further executes instructions for receiving, by the network device, a second measurement report, wherein the second measurement report indicates a second measurement quantity type that corresponds to the measurement resource and that is related to the second slot format of the non-serving cell.

\* \* \* \* \*